(12) United States Patent
Fel

(10) Patent No.: US 11,987,214 B2
(45) Date of Patent: May 21, 2024

(54) VEHICLE

(71) Applicant: Bombardier Transportation GmbH, Berlin (DE)

(72) Inventor: Landri Fel, Vienna (AT)

(73) Assignee: Bombardier Transportation GmbH, Berlin (DE)

( * ) Notice: Subject to any disclaimer, the term of this patent is extended or adjusted under 35 U.S.C. 154(b) by 309 days.

(21) Appl. No.: 17/415,088

(22) PCT Filed: Dec. 17, 2019

(86) PCT No.: PCT/EP2019/085743
§ 371 (c)(1),
(2) Date: Jun. 17, 2021

(87) PCT Pub. No.: WO2020/127337
PCT Pub. Date: Jun. 25, 2020

(65) Prior Publication Data
US 2022/0063564 A1 Mar. 3, 2022

(30) Foreign Application Priority Data
Dec. 18, 2018 (DE) ..................... 10 2018 132 632.7

(51) Int. Cl.
*B60S 1/08* (2006.01)
*B60S 1/04* (2006.01)
*B60S 1/56* (2006.01)

(52) U.S. Cl.
CPC .............. *B60S 1/08* (2013.01); *B60S 1/0452* (2013.01); *B60S 1/566* (2013.01)

(58) Field of Classification Search
CPC .......... G03B 17/02; H04N 5/225; B60R 1/00; B60S 1/566; B60S 1/0452; B60S 1/08
USPC ...................................... 15/250.15
See application file for complete search history.

(56) References Cited

U.S. PATENT DOCUMENTS

| 3,644,956 A | 2/1972 | Parker |
| 4,122,578 A | 10/1978 | Pretty |
| 2002/0139394 A1 | 10/2002 | Bronson |

(Continued)

FOREIGN PATENT DOCUMENTS

| DE | 2752275 A1 | 6/1978 |
| DE | 102015226556 A1 | 6/2017 |

(Continued)

*Primary Examiner* — Katina N. Henson
(74) *Attorney, Agent, or Firm* — The Webb Law Firm

(57) ABSTRACT

A wiper arrangement for a vehicle is configured for cleaning a sensor field of vision of a windshield and thereby has a wiping element and a carrier. The carrier can be fastened on the windshield. The wiping element is movably mounted on the carrier. The carrier, the wiping element and/or mounting elements acting between the carrier and the wiping element is/are configured so that the wiping element can assume at least one fixed holding position-relative to the carrier, and wherein the wiping element can be brought out of the fixed holding position at least by overcoming a defined holding force. Furthermore, the mounting of the wiping element on the carrier is selected such that the wiping element is always driven to assume at least one specific, preferably a first holding position or second specific holding position with respect to the carrier.

15 Claims, 4 Drawing Sheets

(56) References Cited

U.S. PATENT DOCUMENTS

2006/0256459 A1\* 11/2006 Izabel ...................... B60S 1/56
359/872
2015/0090291 A1   4/2015 Na et al.
2017/0369039 A1\* 12/2017 Rousseau .............. B60S 1/3404

FOREIGN PATENT DOCUMENTS

| DE | 102016103265 A1 |   | 8/2017 | |
|----|----|----|----|----|
| JP | 2000168509 A |   | 6/2000 | |
| JP | 2014125104 A | \* | 7/2014 | ............ B60S 1/0848 |
| WO | 2014103726 A1 |   | 7/2014 | |
| WO | 2018150428 A1 |   | 8/2014 | |

\* cited by examiner

VEHICLE

CROSS-REFERENCE TO RELATED APPLICATIONS

This application is the United States national phase of International Application No. PCT/EP2019/085743 filed Dec. 17, 2019, and claims priority to German Patent Application No. 10 2018 132 632.7 filed Dec. 18, 2018, the disclosures of which are hereby incorporated by reference in their entirety.

BACKGROUND OF THE INVENTION

Field of the Invention

The present invention relates to a wiper arrangement for a vehicle, a system for a front portion of a vehicle, and a vehicle. In particular, the invention deals with design possibilities in order to be able to clean a sensor field of vision in a windshield of a vehicle.

Description of Related Art

Vehicles for transporting passengers or goods are generally known, for example designed as vehicles for public transportation, in particular as a tram, subway, commuter rail, bus, etc., as a passenger vehicle, truck, and/or freight train.

Such vehicles are partially equipped with optical sensors, which may be used to control the vehicle and/or to monitor the operation of the vehicle.

A locomotive is known from U.S. Pat. No. 3,644,956, wherein a windshield may be freed from water and/or dirt by means of two wiper blades. The wiper blades may be swept in a transverse direction across a respective section of the windshield with the aid of a reciprocal gearing.

U.S. patent application US 2002/0139394 A1 discloses a device for shielding a lens of a camera, wherein this is installed in a housing with a window. In order to guarantee the function of the camera, the housing is equipped with a window wiping system, wherein the window may rotate while being subjected to a wiping element. By this means, contaminants and water are satisfactorily removed from the window.

The previously known technical solutions and embodiments are, however, either very complexly designed, do not permit efficient use of energy or space, and/or are vulnerable to failure.

SUMMARY OF THE INVENTION

The object of the present invention is therefore to provide a wiper arrangement, a system with a wiper arrangement, and a vehicle with such a system, wherein the listed objects are fail-proof, have a simple design, and are able to simultaneously prevent or at least reduce the disadvantages of the prior art.

The above problem is solved by a wiper arrangement, a system for a front portion of a vehicle, and a vehicle as described herein.

According to an embodiment, the wiper arrangement functions for cleaning a sensor field of vision of a windshield which is arranged in the area of a front portion of a vehicle. A windshield of a vehicle functions primarily to allow a person in the vehicle, for example, a driver, to look outside. Accordingly, a section of the windshield may be referred to as the main field of vision, which is configured or defined such that a driver in the interior vehicle space of the vehicle may recognize all relevant surroundings details through this main field of vision.

Furthermore, an optical sensor may be mounted behind the windshield in the interior of the vehicle, whose beam path extends through the sensor field of vision of the windshield, for example in order to monitor a vehicle surroundings. According to an embodiment, the sensor field of vision is provided outside the main field of vision of the windshield, so that a view of the driver through the main field of vision is not obstructed by the optical sensor associated with the sensor field of vision. The arrangement of the sensor field of vision outside of the main field of vision includes that both fields overlap by up to 20%, preferably up to 10%, particularly preferably up to 5% of the size of the sensor field of vision. The sensor field of vision may either be predetermined and/or may be defined by a field of vision of the associated optical sensor.

The wiper arrangement thereby has a wiping element and a carrier, wherein the carrier is configured and/or provided with corresponding fastening means for being fastened to the windshield or in direct proximity of the windshield. For example, the carrier may be fastened directly to the windshield, in particular by a frictional interlocking or a material interlocking. Furthermore, the carrier may be provided with a device for providing a negative pressure between the carrier and the windshield and/or with an adhesive surface, so that a normal suction force or an adhesive interlock is generated between the carrier and the windshield. It is also within the scope of the invention if the carrier is designed such that it may be fastened, for example, in the edge or frame area of the windshield inside or outside the vehicle or the front portion of the vehicle.

The wiping element is movably supported on the carrier. The carrier, the wiping element and/or mounting elements acting between the carrier and the wiping element is/are configured such that the wiping element may assume at least one fixed holding position relative to the carrier, and wherein the wiping element may be brought out of the fixed holding position at least by overcoming a defined holding force.

The carrier of the wiper arrangement for the sensor field of vision is designed such that it may be mounted in the direct vicinity of the sensor field of vision; however, does not substantially cover the sensor field of vision.

Furthermore, the wiping element may be slidably, pivotally, and/or rotatably mounted on the carrier. In particular, the wiping element may be provided in a fully rotatable manner on the carrier, such that a complete 360° rotation of the wiping element around the carrier leads to a circularly cleaned surface of the sensor field of vision.

Alternatively, it is conceivable that the wiping element is mounted on the carrier to be partially rotatable such that the wiping element may carry out a pivoting movement for cleaning the sensor field of vision on the windshield.

Furthermore, the mounting of the wiping element on the carrier is selected such that the wiping element is always driven to assume at least one specific, preferably a first holding position or second specific holding position with respect to the carrier. It is thus achieved that the wiping element does not carry out undesired movements, for example, caused by a movement of the vehicle (bump) or by flow forces (rain). Basically, it might be stated that the wiping element located in a holding position is fixed, arranged relatively firmly, and statically determined.

In addition, carrier and wiping element and/or a mounting element acting between the same is/are configured such that the wiping element is held in the fixed holding position by a defined holding force. If the wiping element is to be moved out of the fixed holding position, then an application of force, preferably on the wiping element, is required, which is greater than the fixed holding force.

By this, it is initially achieved that a separate wiper arrangement may be arranged on a windshield of a vehicle, wherein this wiper arrangement is provided exclusively for cleaning a sensor field of the windshield.

The mounting of the wiping element on the carrier may be configured and/or provided with mounting means such that, when the carrier is fastened on the windshield or in the direct vicinity of the windshield in accordance with the intended use, the wiping element may be brought out of the fixed holding position by a wiping movement of a wiper blade of a windscreen wiper arrangement of the main field of vision of the windshield. Consequently, such an arrangement enables the wiping element to be driven and/or actuated by the wiper blade of the windshield wiper arrangement when fastened to the windshield in accordance with the intended use.

According to an embodiment, a wiper arrangement is provided, wherein no separate actuating device and/or drive device is required for driving and/or actuating the wiping element, but instead and in particular, a third component, already in use, is used for this purpose. The energy for actuating the wiping element originates substantially exclusively from the windshield wiper arrangement of the main field of vision, in particular from the kinetic energy of the wiper blade of the windshield wiper arrangement. The wiper arrangement thus has no independent, for example, manual drive means and/or no actuating means consuming electrical energy for actuating the wiping element.

In the context of the invention, it is disclosed that the wiper arrangement is supported movably on the carrier such that the wiping element, and in particular a further element which is kinematically associated with the wiping element, for example a wiper arm supporting the wiping element, is arranged in a holding position, in particular, entirely outside the sensor field of vision. This results in that the sensor field of vision is not covered by the wiping element or a further element associated therewith, when the wiping element is located in a holding position. By this means, a beam path of an optical sensor assigned to the sensor field of vision is not obstructed by the wiping element and, in particular, not be a further kinematic element associated with the wiping element.

According to another embodiment, the wiping element is supported movably on the carrier in such that the wiping element may assume a fixed first holding position and a fixed second holding position. In particular, suitable mounting means are provided between the carrier and wiping element for this purpose. In order to move the wiping element out of one of these holding positions, an effective first or second holding force must be overcome in the respective holding position.

Corresponding to an embodiment, the carrier is provided with a rotational support such that the wiping element may be pivoted back and forth between the first holding position and the second position. In particular, the wiping element is thereby supported movably on the carrier in such a way, or corresponding mounting and/or tensioning means are provided acting between the carrier and wiping element, that the wiping element always moves into the fixed first holding position or into the fixed second holding position. Correspondingly, the wiping element is always located in the fixed first holding position or in the fixed second holding position in particular, in the case of non-actuation by the wiper blade of the windshield wiper arrangement, thus in the rest position.

Consequently, the wiper arrangement is suitable for the sensor field, for cleaning an area of the windshield similar to a circular segment. The wiping element is thereby always located in a defined position. Such a fixed position is only left when the wiping element is moved back and forth between the fixed first holding position and the fixed second position by a wiper blade of the windshield wiper arrangement.

According to another embodiment, a first stop and a second stop may be provided, wherein these stops are suitable for limiting a (pivoting) movement of the wiping element with respect to the first holding position and the second holding position.

According to a specific embodiment, the windshield wiper arrangement is provided with flexible elements, which are arranged such that a collision of the wiper blade of the windshield wiper arrangement with the wiping element of the wiper arrangement is cushioned and/or damped. By this, mechanical loads on the components are reduced, which results in an extension of operating lifetime. This is because for each individual wiping operation of the wiper arrangement, an initial actuation of the wiping element by the wiper blade is necessary. This causes a high number of actuation collisions to occur between the wiping element and wiper blade, whose effects are mitigated by the described embodiment.

According to an embodiment, it is disclosed that pretensioning means and/or holding means are provided which provide a corresponding holding force between the wiping element and a stop and thus hold the wiping element in a fixed holding position.

Such pretensioning means may be arranged, for example, in such a way between the carrier and the wiping element that the pretensioning means always move the wiping element either into the fixed first holding position or into the fixed second holding position. In particular, when being arranged between the fixed holding positions the wiping is exclusively in an instable intermediate position. Correspondingly, in an instable intermediate position, the wiping element is always driven to one of the fixed holding positions.

In particular, it is disclosed in this context that a further element, kinematically associated with the wiping element, is designed to be relatively flexible. This is because this further element interacts with the wiper blade for actuating the wiping element by coming into contact by a collision, wherein the flexibility of the further element enables that the wiper blade may sweep past the wiping element, in particular by the wiper blade correspondingly deforming the further element. The further element may thereby be configured, if necessary, integrally with the wiping element, or as a separate component connected to the wiping element.

Said holding means may be designed and arranged such that these hold the wiping element in the fixed first and fixed second positions and/or form the first and/or second stops. According to an embodiment, the holding means may be designed, at least partially, as magnets, in particular with a spring element, wherein at least one magnet is respectively arranged by means of at least one spring element on a stop and/or on the wiping element. In particular, a magnetic force may thereby be generated between a stop and the wiping element, which thus functions as the holding force for holding the wiping element in a holding position.

While a magnet is only fastened to a stop and/or to a wiping element by means of a spring only according to one specific embodiment, a collision between the wiper blade and the wiping element may lead to a force which exceeds the magnetic holding force. Correspondingly, a wiping movement of the wiping element is triggered. The use of springs thereby causes that the detachment of the wiping element from the holding position is always carried out at a specific threshold of force.

In particular, it is expressed in the preceding embodiment that a further element, kinematically associated with the wiping element, is designed as relatively rigid. This is because this further element functions with the wiper blade to actuate the wiping element by coming into contact through a collision, wherein a sweeping of the wiper blade past the wiping element is thereby enabled that the wiping element may be pushed out of the way of the wiper blade due to the use of magnets and spring elements.

In the context of the invention, a system for a front portion of a vehicle is further disclosed. Such a front portion is at least partially sealed by a windshield. Furthermore, the windshield has a main field of vision for allowing a person a view from an interior vehicle space of the vehicle, and furthermore has a sensor field of vision for allowing an optical sensor a beam path through the windshield. The system is furthermore equipped with a windshield wiper arrangement with at least one wiper blade for cleaning the main field of vision. In addition, a wiper arrangement is provided according to one or more of the preceding embodiments for cleaning the sensor field of vision. Such a wiper arrangement is thereby fastened in such a way on the windshield or in the direct vicinity of the windshield on the vehicle in that the wiping element is supported on the carrier and wherein the carrier is fastened such on the windshield or in the direct vicinity thereof so that the following may be effected:

The wiping element arranged in a fixed holding position may be moved out of this holding position by the wiper blade of the windshield wiper arrangement of the vehicle bumping into the wiping element of during a wiping movement of the wiper blade. An actuating force acting counter to the holding force is induced in the wiping element by this collision, wherein the wiping element moves out of the fixed holding position upon exceeding the holding force. The wiper arrangement is thus equipped with two holding positions and/or two stops according to an embodiment, thus a first collision causes the detaching of the wiping element out of the first holding position, whereby the wiping element sweeps across and cleans the sensor field of vision and immediately transitions into the second holding position.

The wiping element may then detach from this second holding position when, for example, the likewise pivoting wiper blade collides again with the wiping element during a return movement and the same moves back into the first holding position. Correspondingly, the position of the wiper arrangement on the windshield and the support of the wiping element on the carrier is/are selected and designed such that the wiping element is moved out of the first holding position by means of a first movement of the wiper blade and brought into the second holding position, and such that the wiping element is brought out of the second holding position by a second return movement of the wiper blade and moved back into the first holding position.

According to one specific embodiment, flexible and/or shock-absorbing contact means are installed between the wiping element and the wiper blade. It is also conceivable to configure the wiping element flexibly and pliably such that this is initially flexibly deformed by a collision with the wiper blade and only then detaches from the respective holding position.

Alternatively or additionally, the flexibility of the wiping element may enable that a wiper blade of the windshield wiper arrangement may sweep past the wiping element after an actuation of the same, wherein it is ensured despite this that the wiping element may be hit and actuated again by the wiper blade moving back.

Furthermore, a vehicle is disclosed with a system according to one or more of the previously mentioned embodiments. The vehicle thereby has a front with a windshield, wherein an optical sensor, whose field of vision is guided through the sensor field of vision of the windshield, is provided in an interior vehicle space of the vehicle. Such a vehicle may be a vehicle for public transportation, thus, for example, a bus, a tram, a light rail vehicle, a subway, a commuter train, or an express train.

The invention enables for the first time that an optical sensor can be used on a separate sensor field of vision with a wiper arrangement on a vehicle, wherein the main field of vision of the windshield is not covered by the optical sensor. Simultaneously, it is ensured that a beam path of the optical sensor through the windshield, in particular through the sensor field of vision, is substantially allowed at any time without obstruction. It has thereby proven particularly favorable, that the wiper arrangement may be actuated by a present windshield wiper arrangement.

According to an embodiment, a system for retrofitting vehicles is disclosed, wherein a wiper arrangement according to one or more of the previously mentioned embodiments is provided, and in particular this is additionally equipped with flexible, damping, and/or adjustable collision elements, such that an actuation of the wiping element by a wiper blade does not lead to damage on the wiper blade. The collision elements are, in particular, adjustable in such a way that a speed of the wiping element of the wiper arrangement is reconcilable to an actuation speed of the windshield wiper arrangement.

The previously described embodiments may be combined with one another in any way, in particular these embodiments may be combined in a reasonable way in the year of the skilled person. For example, suitable combinations of magnetic holding elements and pretensioning elements may be arranged on the wiping element and/or on the stops such that the wiping element may be particularly reliably removed from a holding position and/or moved out of the sensor field of vision.

BRIEF DESCRIPTION OF THE DRAWINGS

The figures illustrate an embodiment and serve in conjunction with the description to teach principles of the invention. The elements of the figures are relative to each other and not necessarily to scale.

DESCRIPTION OF THE INVENTION

Figure 1:
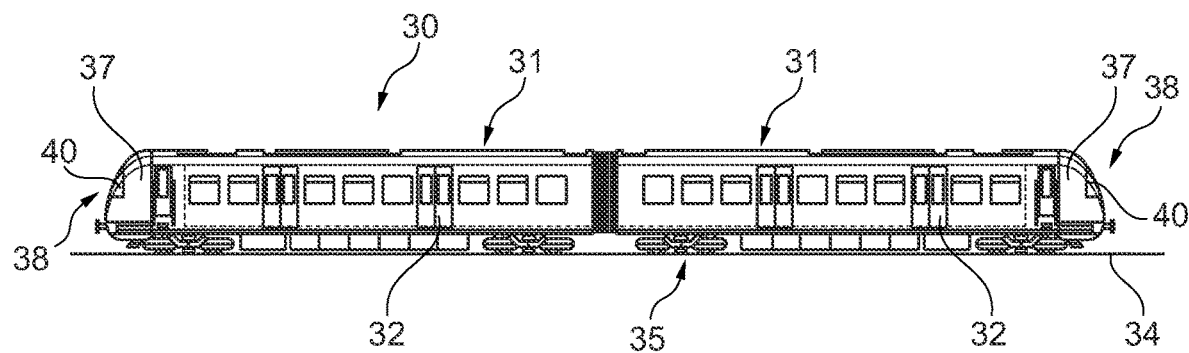
FIG. 1 shows a vehicle according to one exemplary embodiment as a rail vehicle.

To provide an overall understanding, a vehicle 30 designed as a rail vehicle is shown in FIG. 1. This includes two railcars 31 and two vehicle bodies 36, wherein the access for passengers into an interior vehicle space 43 of the respective vehicle body 36 is enabled with the aid of a door assembly 32. In addition, vehicle 30 is mounted on rails 34 via multiple rolling units 35.

A driver's cabin 37 is respectively provided in the area of front portions 38 at the ends of vehicle 30 in a longitudinal direction 33, wherein the driver's cabin is sealed with a windshield 40.

Figure 2:
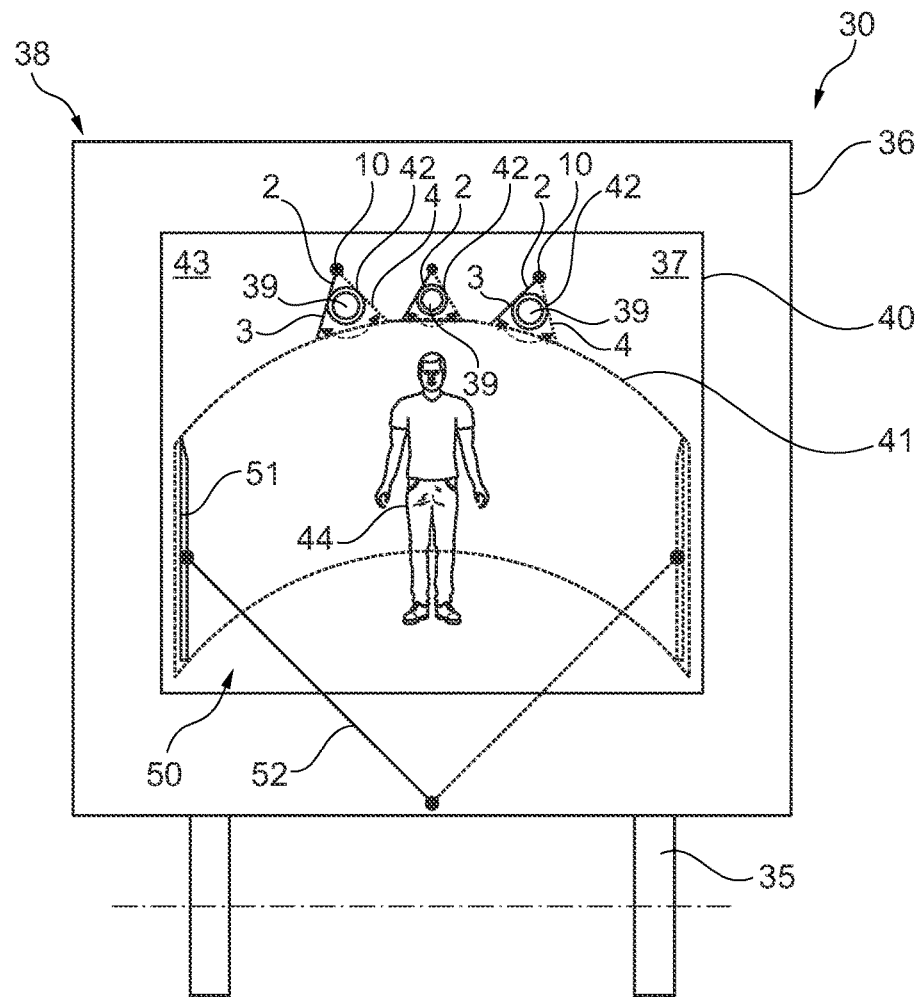
FIG. 2 represents a schematic view of a front of the rail vehicle according to FIG. 1.

FIG. 2 is a schematic depiction of a front view of a front portion 38 of vehicle 30. Driver's cabin 37 with interior vehicle space 43 among others is formed by vehicle body 36, wherein a large part of a front surface of front portion 38 is taken up by windshield 40.

In order to enable driver 44 a view through windshield 40, a main field of vision 41 of windshield 40 is cleaned and freed of rainwater by a windshield wiper arrangement 50. Windshield wiper arrangement 50 has at least one lever mechanism 52, a wiper blade 51 arranged on lever mechanism 52, and a drive, not shown. Wiper blade 51 thereby sweeps substantially across main field of vision 41 relevant for driver 44 in the course of a pivot movement.

Multiple sensor fields of vision 42 are located above the main field of vision 41 in windshield 40, behind which sensor fields of optical sensors, embodied as a camera 39, is/are mounted either directly on the inner side of windshield 40 or in the interior vehicle space 43.

Furthermore, a wiper arrangement 1 is fastened on an outer side of windshield 40 for each sensor field of vision 42. This wiper arrangement has at least one carrier 10 with a rotational support 11, on which a wiping element 2 is pivotably mounted. The wiping element 2 may thereby alternately assume a first holding position 3 and a second holding position 4, wherein wiping element 2 does not substantially obstruct the sensor field of vision 42 in such a position.

Furthermore, wiper arrangements 1 are positioned and aligned on the windshield 40 such that the wiper blade 51 may bump into and thus actuate wiping element 2 during a wiping movement across main field of vision 41. If wiper blade 51 is now pivoted from the left side of windshield 40 to the right side of the windshield (depiction of wiper blade 51 by dashed line), then wiping elements 2 of wiper arrangement 1 are transitioned from first holding position 3 into second holding position 4, by which means sensor field of vision 42, together with main field of vision 41, is freed from dirt and/or rainwater.

The specific embodiment and a kinematic relationship between a wiper arrangement 1 and windshield wiper arrangement 50 of vehicle 30 is described in detail by way of the two embodiments of wiper arrangement 1.

Figure 3:
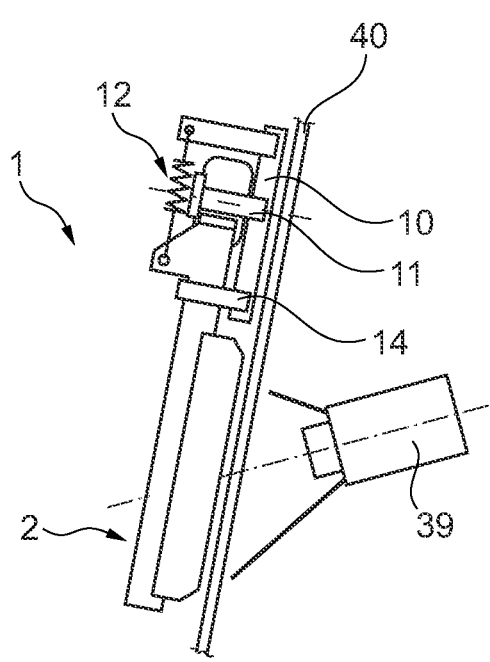
FIG. 3 is a first embodiment of a wiper arrangement in a side view.
Figure 4:
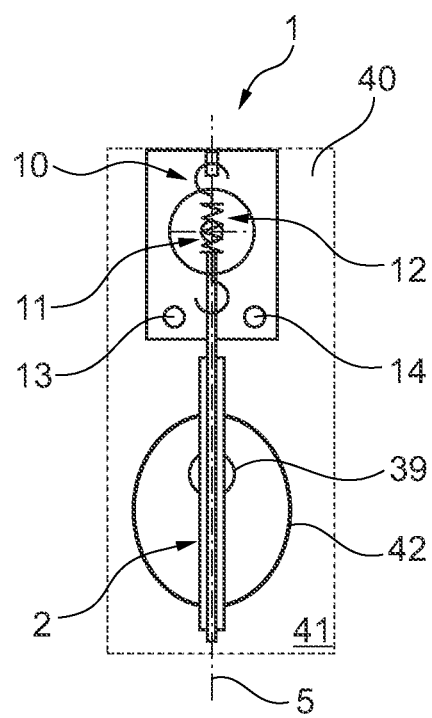
FIG. 4 is a front view of the wiper arrangement according to FIG. 3.
Figure 5:
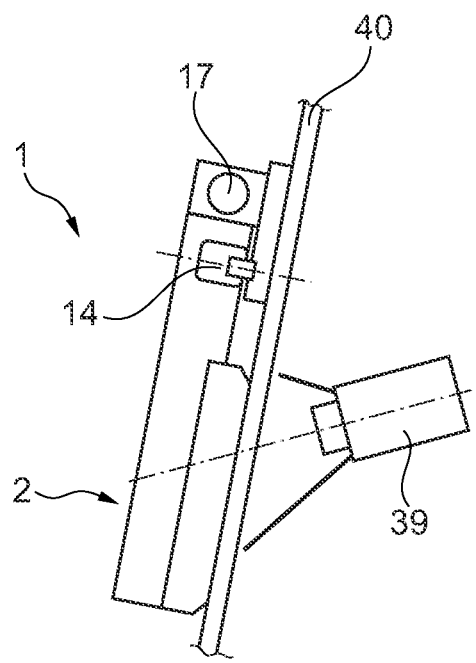
FIG. 5 is a second embodiment of a wiper arrangement in a side view.
Figure 6:
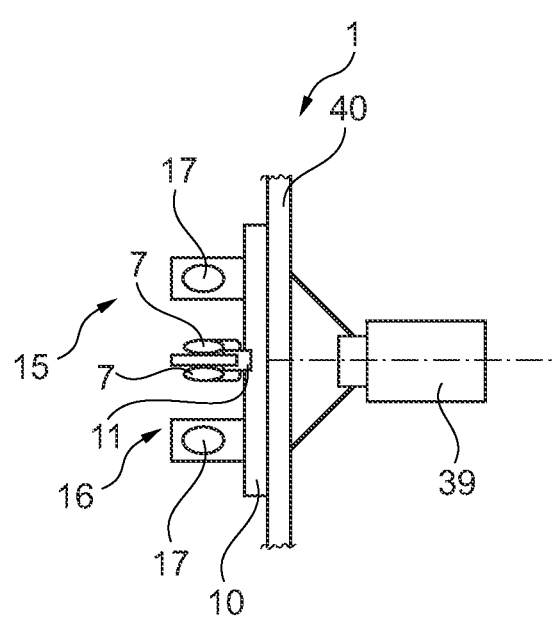
FIG. 6 is a view from above of the wiper arrangement according to FIG. 5, FIG. 7 to FIG. 10 show front views on a windshield of the rail vehicle with a wiper arrangement according to the first embodiment in different movement states.

A first embodiment of wiper arrangement 1 is discussed with FIG. 3, FIG. 4, and FIG. 7 to FIG. 10. FIG. 3 shows wiper arrangement 1 in a schematic side view, and FIG. 4 in a schematic front view, while FIG. 7 to FIG. 10, in contrast, are to put the movement progression and advantageous embodiments of wiper blade 51 and wiper arrangement 1 into greater focus.

Wiper arrangement 1 thereby has a carrier 10, which is suitably mounted on windshield 40 in order to sweep substantially completely across and thus clean sensor field of vision 42 with the aid of a wiping element 2. Wiping element 2 is mounted on rotational support 11 to be pivotable between a first holding position 3 and a second holding position 4.

First and second holding positions 3 and 4 are manifested by a first stop 13 and a second stop 14, wherein pretensioning means 12 are additionally provided in order to provide a holding force between stops 13 and 14 and wiping element 2. Pretensioning means 12, designed as springs, are fastened on a central axis 5 on carrier 10 and on wiping element 2 such that, depending on the position of wiping element 2 with respect to central axis 5, one component of the pretensioning force of pretensioning means 12 acts on wiping element 2 either toward first stop 13 or toward second stop 14. In this way, it is achieved that wiping element 2 is always driven to dwell either in first holding position 3 on first stop 13 or in the second holding position on second stop 14.

Figure 7:
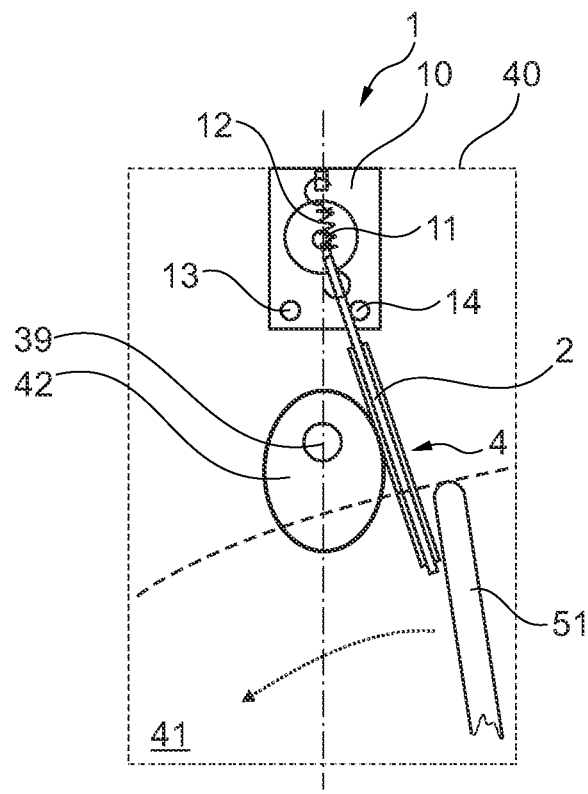
Figure 8:
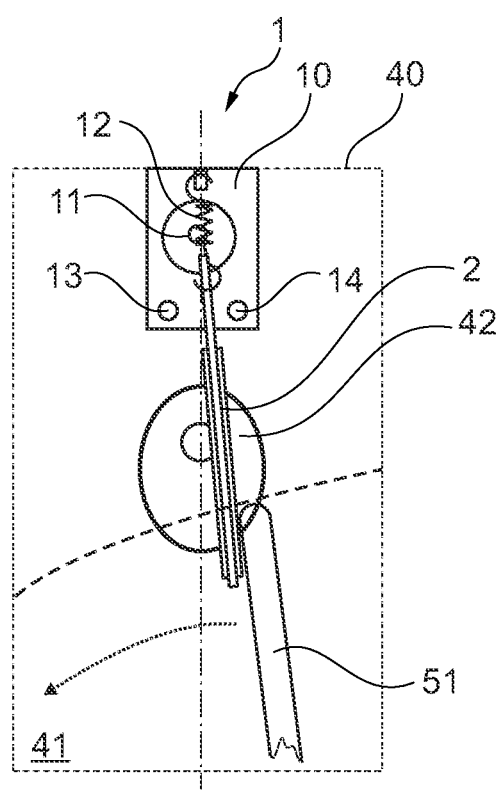

In FIG. 7, wiping element 2 is located in second holding position 4, wherein pretensioning means 12 press wiping element 2 on the second stop 14.

If wiper blade 51 now sweeps across windshield 40 from right to left (see FIG. 8 to FIG. 10), then it pushes wiping element 2 away from second stop 14 to first stop 13. Wiping element 2 thereby sweeps completely across sensor field of vision 42 and cleans the same.

In that moment when wiping element 2 crosses central axis 5, pretensioning means 5 provide a force component which pulls wiping element 2 forward into first holding position 3 to first stop 13.

Figure 9:
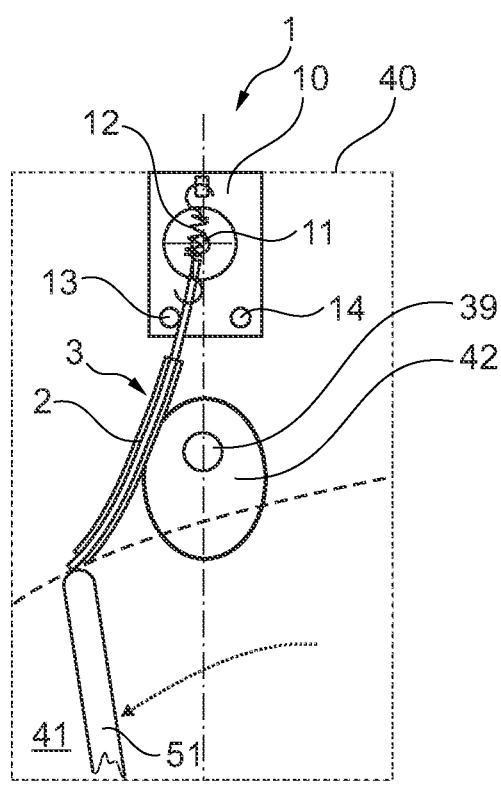
Figure 10:
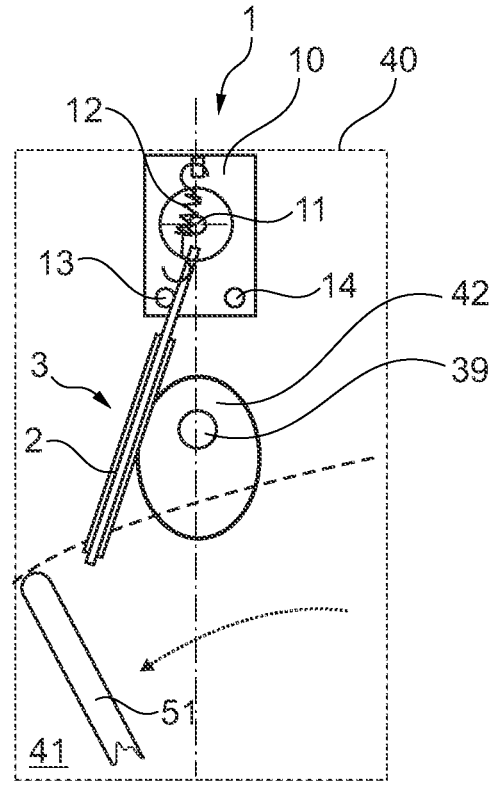

FIG. 9 illustrates one specific aspect of the first embodiment. Wiping element 2 and/or a further element (not shown here), kinematically associated with wiping element 2, enable wiper blade 51 to guide its wiping process completely to the end, in that wiper blade 51 sweeps through under wiping element 2 and may release the contact. This is enabled in that wiping element 2 and/or the further element are flexible at least in sections and may bend in such a way that wiper blade 51, on the way from right to left, may sweep past wiping element 2 and, however, on a return path from left to right, may again come into contact with wiping element 2.

In this way it is achieved that wiper arrangement 1 always completely sweeps across sensor field of vision 42 upon actuation by wiper blade 51, and otherwise is reliably located in one of holding positions 3 and 4 and thereby does not cover sensor field of vision 42. Furthermore, the wiping movement of wiping element 2 may align with a movement of wiper blade 51, wherein its complete pivot movement is not negatively influenced by wiper arrangement 1.

FIG. 5 and FIG. 6, and FIG. 11 to FIG. 14 describe a second embodiment of wiper arrangement 1, wherein wiping element 2 is pivotably fastened to carrier 10 via a rotational support 11.

The second embodiment of wiper arrangement 1 differs from the first embodiment of wiper arrangement 1 in that it is ensured in a different way that wiping element 2 is always located in first holding position 3 on first stop 13, or otherwise in second holding position 4 on second stop 14. In an alternative form, it is thereby enabled that wiper blade 51 may sweep past wiping element 2 without wiping element 2 remaining outside of an actuating area of wiper blade 51 (as almost in FIG. 13) and always returns to the same.

Magnets 17 are provided via spring means 18 on carrier 10 for each holding position 3 and 4, wherein magnets 17 may interact with further magnets 7 of wiping element 2.

Figure 11:
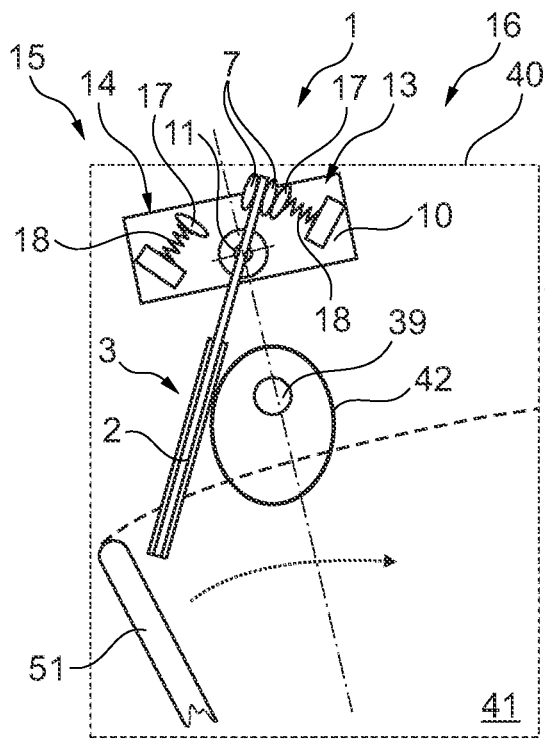
FIG. 11 to FIG. 14 depict a front view on a windshield of the rail vehicle with a wiper arrangement according to the second embodiment in different movement states.
Figure 12:
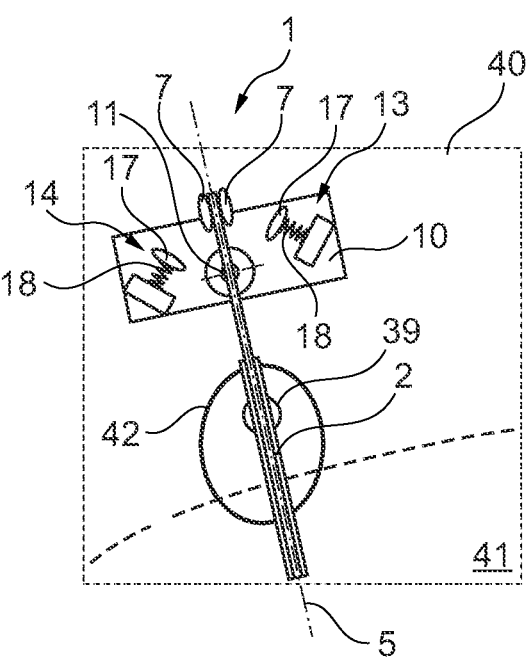

In FIG. 11, wiping element 2 is located in first holding position 3 to the left of sensor field of vision 42, wherein wiper blade 51 moves from left to right and is poised to collide with wiping element 2. In the moment of initial contact between wiper blade 51 and wiping element 2, wiper blade 51 pulls wiping element 2 with it, wherein a contact of magnets 17 and 7 is initially not released.

Figure 13:
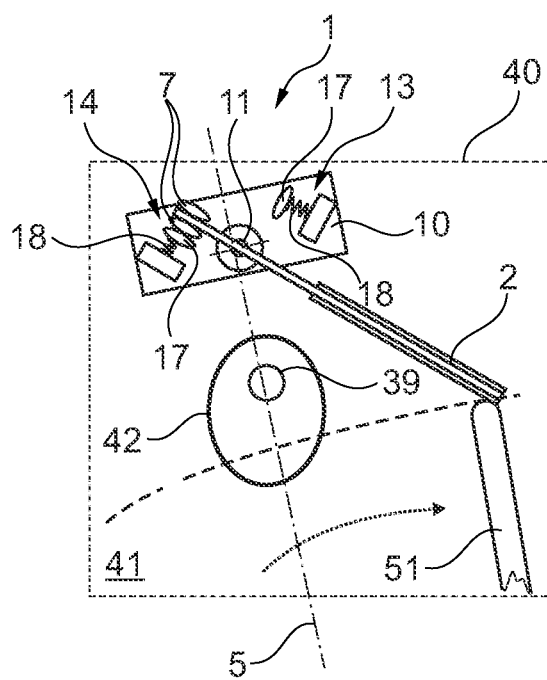

Only when a magnetic holding force of magnets 17 and 7 is overcome does wiping element 2 sweep across sensor field of vision 41 (FIG. 12) and is moved far across the same (FIG. 13). Spring means 18 of stop 14 on the left side thereby compensate for this excessive deflection of wiping element 2.

Figure 14:
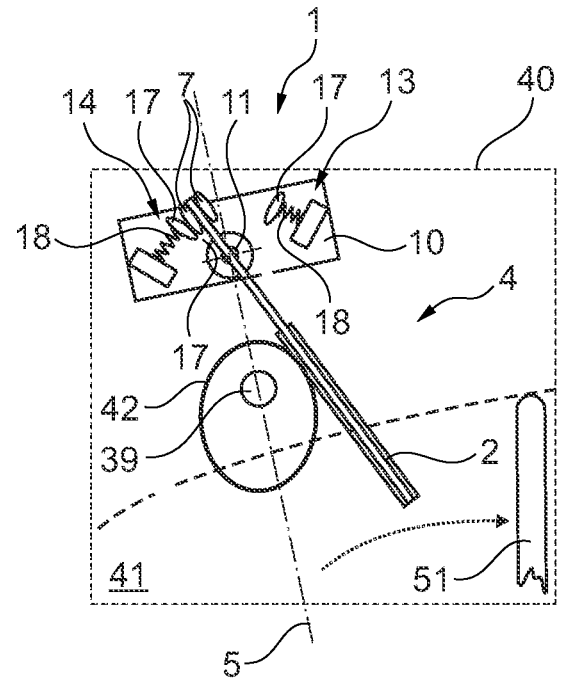

As soon as wiping element 2 and wiper blade 51 move out of contact, spring means 18 push wiper element 2 back to an edge of sensor field 39 (FIG. 14). From there, a returning wiper blade 51 may actuate wiping element 2 again.

Even if specific embodiments are depicted and described herein, it remains within the scope of the present invention to suitably modify the embodiment shown without deviating from the scope of protection of the present invention. For example, the configuration of stops 13 and 14 according to the second embodiment, in particular the use of magnets 17 and/or spring means 18 may also take place in a suitable way in the first embodiment.

The invention claimed is:

1. A wiper arrangement for cleaning a sensor field of vision on a windshield of a front portion of a vehicle, the wiper arrangement comprising:
    a wiping element and a carrier,
    wherein the carrier is configured or provided with corresponding fastening means for being fastened to the windshield or in a direct proximity of the windshield,
    wherein the wiping element is supported movably on the carrier such that the wiping element is positionable into at least one fixed holding position relative to the carrier and is positionable out of the fixed holding position at least by overcoming a defined holding force, and
    wherein the wiping element is supported on the carrier such that and is configured such that, when the carrier is fastened to the windshield or in the direct vicinity of the windshield, the wiping element is positionable out of the fixed holding position by a wiping movement of a wiper blade of a windscreen wiper arrangement of the windshield.

2. The wiper arrangement according to claim 1, wherein the wiper arrangement has no separate actuating means or no actuating means consuming electrical energy for actuating the wiping element.

3. The wiper arrangement according to claim 1, wherein the wiping element is supported movably on the carrier such that the wiping element, is arranged in a holding position outside the sensor field of vision.

4. The wiper arrangement according to claim 1, wherein the wiping element is supported movably on the carrier such that the wiping element can assume at least one stable first holding position and one stable second holding position relative to the carrier, wherein the wiping element can be brought out of the first holding position at least by overcoming a defined first holding force and out of the second holding position by overcoming a defined second holding force.

5. The wiper arrangement according to claim 4, wherein the wiping element is supported movably on the carrier such that the wiping element is always driven to assume either the first holding position or the second holding position.

6. The wiper arrangement according to claim 4, wherein the carrier comprises a rotational support by which the wiping element is pivotably supported on the carrier.

7. The wiper arrangement according to claim 1, further comprising at least one of a first stop and a second stop configured and arranged on the carrier such that a possibility of movement of the wiping element is limited by the at least one of the first stop and the second stop.

8. The wiper arrangement according to claim 7, further comprising pretensioning means which are configured such and arranged on the carrier or on the wiping element such that the holding force can be provided by means of the pretensioning means between the wiping element and the first stop and/or between the wiping element and the second stop.

9. The wiper arrangement according to claim 8, wherein the pretensioning means comprise at least one spring element effectively arranged between carrier and wiping element.

10. The wiper arrangement according to claim 7, comprising holding means, wherein the holding means are configured and arranged on the carrier and/or on the wiping element such that the holding force can be effectively provided between the wiping element and the first stop and/or the second stop by the holding means.

11. The wiper arrangement according to claim 10, wherein the holding means comprise at least one magnet arranged on the carrier or on the wiping element or a spring means cooperating therewith.

12. A system for a front portion of a vehicle, the system comprising:
    a windshield having a main field of vision for allowing a person to view from an interior vehicle space of the vehicle, and having a sensor field of vision for allowing an optical sensor to be subject of radiation coming through the windshield;
    a windscreen wiper arrangement comprising at least one wiper blade for cleaning the main field of vision of the windshield; and
    a wiper arrangement according to claim 1 for cleaning the sensor field of vision.

13. The system according to claim 12, wherein the wiping element is supported on the carrier such, and wherein the carrier is fixed to the windshield or in the direct vicinity of the windshield on the vehicle such that the wiping element can be brought out of the fixed holding position by a wiping movement of the wiper blade.

14. The system according to claim 12, comprising an optical sensor configured for arrangement on the windshield or on an area adjacent to the windshield in an interior vehicle space of the vehicle, wherein the optical sensor is positioned for operating through the windshield.

15. A vehicle comprising a vehicle body, an interior vehicle space formed by the vehicle body, and a system according to claim 12 provided at a front portion of the vehicle, wherein the interior vehicle space comprises a window portion with the windshield.

\* \* \* \* \*